United States Patent
Shimmoto

(10) Patent No.: US 8,031,376 B2
(45) Date of Patent: Oct. 4, 2011

(54) IMAGE PROCESSING APPARATUS

(75) Inventor: Takafumi Shimmoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 627 days.

(21) Appl. No.: 12/028,595

(22) Filed: Feb. 8, 2008

(65) Prior Publication Data
US 2008/0231906 A1  Sep. 25, 2008

(30) Foreign Application Priority Data
Mar. 19, 2007 (JP) ................. 2007-070288

(51) Int. Cl.
G06K 15/00 (2006.01)
H04N 1/40 (2006.01)
G06F 9/45 (2006.01)

(52) U.S. Cl. ...... 358/3.28; 358/1.14; 717/104; 717/108; 717/120

(58) Field of Classification Search .......... None
See application file for complete search history.

(56) References Cited

U.S. PATENT DOCUMENTS

| 2003/0179412 A1* | 9/2003 | Matsunoshita | 358/3.28 |
|---|---|---|---|
| 2004/0015822 A1* | 1/2004 | Linton et al. | 717/104 |
| 2005/0219605 A1* | 10/2005 | Sato | 358/1.14 |
| 2006/0150146 A1* | 7/2006 | Meijer et al. | 717/108 |
| 2006/0248107 A1* | 11/2006 | Coronado et al. | 707/102 |

FOREIGN PATENT DOCUMENTS

| JP | 2002-157122 | | 5/2002 |
|---|---|---|---|
| JP | 2004-166241 | * | 6/2004 |
| JP | 2004-230858 | * | 8/2004 |
| JP | 2004-303232 | * | 10/2004 |
| JP | 2005-38371 | * | 2/2005 |
| JP | 2006-174085 | | 6/2006 |
| JP | 2006-254382 | * | 9/2006 |
| JP | 2006-287902 | * | 10/2006 |

OTHER PUBLICATIONS

IBM TDB NN9411391 Management of Instance Lists in an Object Oriented System Nov. 1994.*
Apr. 5, 2011 Japanese official action in connection with a counterpart Japanese patent application.

* cited by examiner

Primary Examiner — Twyler Haskins
Assistant Examiner — Barbara Reinier
(74) Attorney, Agent, or Firm — Cooper & Dunham LLP

(57) ABSTRACT

A disclosed image processing apparatus enables input of various documents, addition of various types of embedded information, and implementation of various behaviors associated with embedded information detection results. Information embedded in input document data is detected, and an image processing associated with a detection result is carried out. The image processing apparatus includes a document input mechanism, an embedded information analysis mechanism, a behavior determination mechanism, a document output mechanism, and an image management mechanism. In one embodiment, an interface via which the document input mechanism and the embedded information analysis mechanism are connected, and another interface via which the document input mechanism and the image management mechanism are connected are fixed, so that the document input mechanism can be replaced with a new document input mechanism that inherits from those fixed interfaces, without affecting the other mechanisms.

10 Claims, 24 Drawing Sheets

IMAGE PROCESSING APPARATUS

BACKGROUND

1. Technical Field

This disclosure relates to image processing apparatus such as copiers, facsimile machines, scanners, and printers, and more particularly, to an image processing apparatus whereby information embedded in image data is detected, and a subsequent image processing is determined by the result of detection of such embedded information.

2. Description of the Related Art

Significant improvements have been made in image processing technologies and image forming technologies in the past several years, and it is now possible to make highly sophisticated copies of bills or other special documents such as securities, using a digital color copy machine. As a result, it has become often difficult to distinguish an original, authentic document from its copy. Therefore, originals such as the aforementioned specialized documents or classified documents handled at corporations are often rendered incapable of being copied at all, or some other countermeasures are taken to ensure that, if a copy were to be made, such copy would not be able to accurately reproduce the original.

From these perspectives, various technologies have been developed to control the output of image processing apparatus such as a digital color copy machine capable of producing copies or duplicates of a specialized or classified document and the like. Several examples are discussed below.

In Japanese Laid-Open Patent Application No. 2005-038371, in order to ensure the security of paper documents and electronic documents, a security policy of an organization is applied. In Japanese Laid-Open Patent Application No. 2004-166241, in accordance with a security policy prescribing rules concerning the handling of documents, operations performed on a document are controlled, or the security policy is modified.

Japanese Laid-Open Patent Application No. 2006-287902 proposes embedding multibit information in an image or, inversely, detecting such embedded information. In Japanese Laid-Open Patent Application No. 2004-303223, a one-dimensional or two-dimensional barcode is embedded in a printed document so as to indicate its special nature.

In Japanese Laid-Open Patent Application No. 2006-254382, when it is detected that a given paper document or electronic document is one whose output is limited, a particular behavior is implemented. In Japanese Laid-Open Patent Application No. 2004-230858, information for limiting the possible number of times of printing is embedded in printed matter, or a time limit for obtaining a printed output of printed matter is provided.

However, the first two examples, i.e., Japanese Laid-Open Patent Application No. 2005-038371 and 2004-166241 do not describe how information embedded in a paper document can be detected. If the suggested technologies were to be adapted for detecting embedded information, a number of modifications would have to be made in the image processing apparatus.

In the next two examples, i.e., Japanese Laid-Open Patent Application Nos. 2006-287902 and 2004-303223, techniques for embedding information, i.e., types of embedded information are specified, so that the configuration of the image processing apparatus would have to be modified in not too few respects if a new type of information were to be embedded.

In the last two examples, i.e., Japanese Laid-Open Patent Application Nos. 2006-254832 and 2004-230858, behaviors following the detection of embedded information are specified, so that the configuration of the image processing apparatus would also have to be modified in not too few respects if the apparatus were to be adapted for a new behavior.

Thus, in those known image processing apparatus, either the source of input of a document, the type of embedded information, or the behavior following the detection of embedded information is specified. Accordingly, the configuration of the image processing apparatus would have to be modified in many respects if either a new source of document input were to be allowed, a new type of embedded information were to be introduced, or a new behavior associated with a detection result of embedded information were to be added. Thus, in these known image processing apparatus, processing operations are limited within certain specified ranges.

SUMMARY

In an aspect of this disclosure, there is provided an image processing apparatus whereby new requirements or techniques can be accommodated by enabling arbitrary document input, addition of an arbitrary type of embedded information, and implementation of an arbitrary behavior associated with a detection result of embedded information.

In another aspect, there is provided an image processing apparatus in which embedded information in input document data is detected and an image processing is carried out in accordance with a result of detection of the embedded information. The image processing apparatus comprises a document input mechanism; an embedded information analysis mechanism connected to the document input mechanism via a first interface; a behavior determination mechanism connected to the embedded information analysis mechanism via a second interface; a document output mechanism connected to the behavior determination mechanism via a third interface; and an image management mechanism connected to the document output mechanism via a fourth mechanism and to the document input mechanism via a fifth interface. Two of the interfaces associated with any one of the mechanisms are fixed, allowing any one of the mechanisms to be replaced with a substitute mechanism without affecting any of the other mechanisms.

In a preferred embodiment, the first and fifth interfaces are fixed. Thus, the document input mechanism can be replaced with another document input mechanism that conforms to the first and fifth interfaces during image processing, without affecting the other mechanisms and at low cost.

In another preferred embodiment, the first and second interfaces are fixed. Thus, the embedded information analysis mechanism can be replaced with another embedded information analysis mechanism that conforms to the first and second interfaces during image processing, without affecting the other mechanisms and at low cost.

In another preferred embodiment, the second and third interfaces are fixed. Thus, the behavior determination mechanism can be replaced with another behavior determination mechanism that conforms to the second and third interfaces during image processing, without affecting the other mechanisms and at low cost.

In yet another preferred embodiment, the third and fourth interfaces are fixed. Thus, the document output mechanism can be replaced with another document output mechanism that conforms to the third and fourth interfaces, without affecting the other mechanisms and at low cost.

In a further preferred embodiment, the document input mechanism comprises a fixed portion consisting of an extraction of common control portions for document data supplied from various input sources. In this embodiment, a program that is developed such that it inherits from the fixed portion can be dynamically added. Thus, document input from an arbitrary input source or document input specialized for a particular client can be separately added at low cost.

In a further preferred embodiment, the embedded information analysis mechanism comprises a fixed portion consisting of an extraction of common control portions for various information embedding techniques. In this embodiment, a program that is developed such that it inherits from the fixed portion can be dynamically added. Thus, an arbitrary information embedding technique or an information embedding technique specialized for a particular client can be separately added at low cost.

In yet another preferred embodiment, the behavior determination mechanism comprises a fixed portion consisting of an extraction of common control portions for various behaviors associated with various embedded information detection results. In this embodiment, a program that is developed such that it inherits from the fixed portion can be dynamically added. Thus, an arbitrary behavior associated with an embedded information detection result or a behavior associated with embedded information specialized for a particular client can be separately added at low cost.

In yet another preferred embodiment, the document output mechanism comprises a fixed portion consisting of an extraction of common control portions for various document outputs to various output destinations. In this embodiment, a program that is developed such that it inherits from the fixed portion can be dynamically added. Thus, document output to an arbitrary output destination or document output specialized for a particular client can be separately added at low cost.

In another preferred embodiment, a program that is utilized upon application of a behavior associated with an embedded information detection result, or a program that is utilized upon document output to an output destination can be dynamically and individually added. Thus, programs for various behaviors associated with various embedded information detection results or document output to an arbitrary output destination can be developed at low cost.

In another preferred embodiment, a program for a behavior associated with an embedded information detection result and a program that is utilized upon application of such behavior, or a program for a document output to an output destination and a program that is utilized upon such document output can be individually and dynamically added at once. Thus, the amount of work necessary for adding programs can be reduced.

These and other objects, advantages and features of the invention are described in conjunction with the accompanying drawings.

DETAILED DESCRIPTION OF THE PREFERRED EMBODIMENTS

In the following, the present invention is described by way of embodiments with reference to the drawings.

Figure 1:
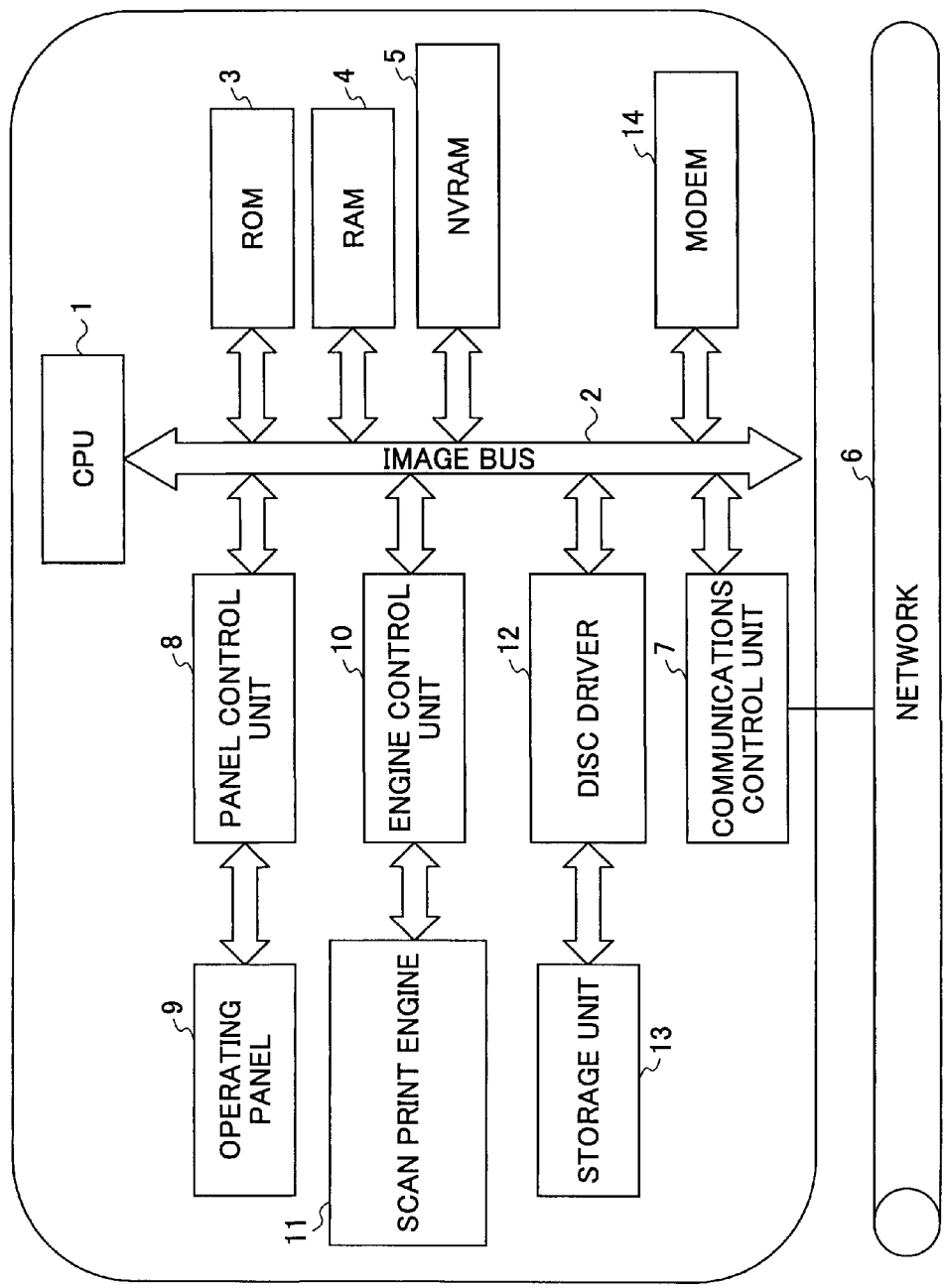
FIG. 1 is a block diagram of an image processing apparatus according to an embodiment of the invention.

FIG. 1 shows a block diagram of an image processing apparatus according to an embodiment of the invention.

The image processing apparatus shown in FIG. 1 comprises a CPU 1 which constitutes a main portion of a microcomputer for centrally controlling the individual units of the apparatus. The CPU 1 is connected via an image bus 2 to a ROM 3 in which fixed data such as a program is stored in advance. It is also connected to a RAM 4 in which various data are saved in a rewritable manner, and to an NVRAM 5 which is a nonvolatile RAM saving data in a nonvolatile manner. The image bus 2 is also connected to a communications control unit 7 coupled with a communications network 6; to an operating panel 9 via a panel control unit 8, the operating panel 9 having an LCD touch panel providing an interface with a user; to a scan/print engine 11 via an engine control unit 10, the scan/print engine 11 configured to cause a scanner unit or a printer unit to implement the input and output of image data, i.e., reading of a paper manuscript and printing on a copy paper; and to a storage unit 13 via a disk driver 12, the storage unit 13 consisting of an HDD for storing image data and control programs. Further, the bus 2 is also connected to a modem 14 for data communications with an external device via a public line or the like.

In this case, while not shown in FIG. 1, the CPU 1 comprises a document input mechanism unit, an embedded information analysis mechanism unit, a behavior determination mechanism unit, a document output mechanism unit, and an image management mechanism unit, as will be described later. The document input mechanism unit and the embedded information analysis mechanism unit are connected via a first interface. The embedded information analysis mechanism unit and the behavior determination mechanism unit are connected via a second interface. The behavior determination mechanism unit and the document output mechanism unit are connected via a third interface. The document output mechanism unit and the image management mechanism unit are connected via a fourth interface. The document input mechanism unit and the image management mechanism unit are connected via a fifth interface.

Figure 2:
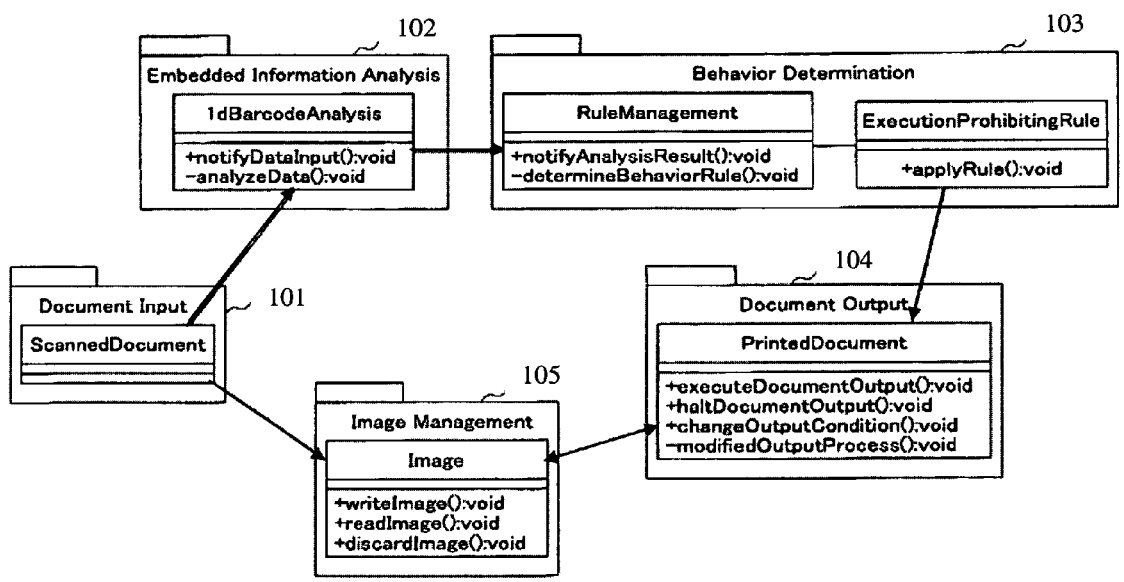
FIG. 2 is a block diagram showing an internal functional configuration of a CPU in the image processing apparatus of the embodiment.

FIG. 2 shows a block diagram illustrating an internal configuration of the CPU 1 on a functional mechanism basis. In the figure, the first through fifth interfaces, via which the individual functional mechanisms are coupled, are omitted.

As shown in FIG. 2, the CPU 1 comprises a document input mechanism unit 101, an embedded information analysis mechanism unit 102, a behavior determination mechanism unit 103, a document output mechanism unit 104, and an image management mechanism unit 105.

The image processing apparatus thus configured operates as follows.

The CPU 1 controls the engine control unit 10 to cause the scan/print engine 11 to scan document data supplied from an arbitrary input source. The input document data thus read is received by the document input mechanism unit 101 and then transferred to the embedded information analysis mechanism unit 102. Simultaneously, the input document data is also transferred to the image management mechanism unit 105. The embedded information analysis mechanism unit 102 analyzes the embedded information, which is a one-dimensional barcode in the present example, in the supplied input document data, and sends an analysis result to the behavior determination mechanism unit 103. The behavior determination mechanism unit 103 selects a behavior rule suitable for the analysis result, and sends the selected behavior rule information to the document output mechanism unit 104. The document output mechanism unit 104 determines a process for the input document data based on the behavior rule information, and supplies a determined result to the image management mechanism unit 105.

In this case, if the processing of the input document data to be performed by the document output mechanism unit 104 involves an implementation of document output, the input document data is received from the image management mechanism unit 105 and printed. If the processing of the input document data involves a termination of document output, the input document data supplied to the image management mechanism unit 105 is discarded and not printed. Other examples of the processing of input document data include changing document output conditions and modifying the document data for output; these examples of processing of document data will be described later.

In this type of image processing apparatus, if the type of input document data that can be processed by the document input mechanism unit 101 is specified, such as "Scanned Document" as shown in FIG. 2, input document data other than a scanned document cannot be processed. In order to provide a function for processing input document data other than a scanned document, the existing document input mechanism unit 101 would have to be replaced with a different document input mechanism unit 101. This would necessitate a modification of the image processing apparatus as a whole, requiring much cost.

Thus, in the image processing apparatus of the present embodiment, in a first example, the first interface (via which the document input mechanism unit 101 and the embedded information analysis mechanism unit 102 are connected) and the fifth interface (via which the document input mechanism unit 101 and the image management mechanism unit 105 are connected) are fixed. In this way, a new document input mechanism unit 106 adapted to a program conforming to the fixed first and fifth interfaces can be developed and the existing document input mechanism unit 101 can be replaced with it. Thus, the new document input mechanism unit 106 can be provided at low cost and without affecting the embedded information analysis mechanism unit 102, the behavior determination mechanism unit 103, the document output mechanism unit 104, and the image management mechanism unit 105.

Figure 3:
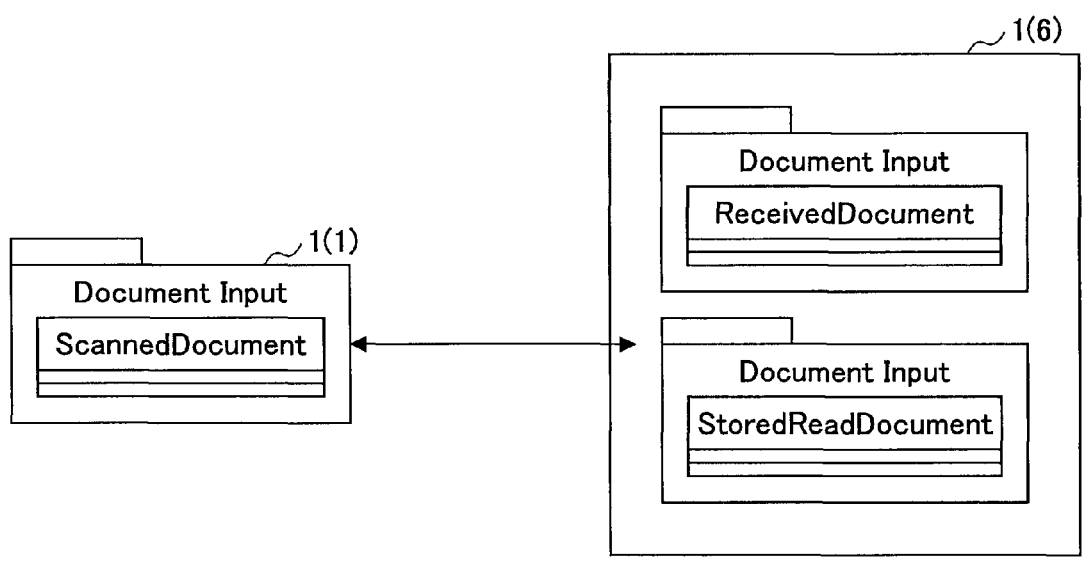
FIG. 3 is a block diagram showing an example of a change of a document input mechanism unit.

FIG. 3 shows a block diagram of the document input mechanism unit 101 being replaced by the document input mechanism unit 106.

While the document input mechanism unit 101 is capable of processing a scanned document as input document data, the new document input mechanism unit 106 is capable of processing a received document and a stored/read document as input document data.

In a second example, the first interface (via which the document input mechanism unit 101 and the embedded information analysis mechanism unit 102 are connected) and the second interface (via which the embedded information analysis mechanism unit 102 and the behavior determination mechanism unit 103 are connected) are fixed. In this way, a new embedded information analysis mechanism unit 107 adapted to a program conforming to the fixed first and second interfaces can be developed and the existing embedded information analysis mechanism unit 102 can be replaced with it. Thus, the new embedded information analysis mechanism unit 107 can be obtained at low cost without affecting any of the document input mechanism unit 101, the behavior determination mechanism unit 103, the document output mechanism unit 104, and the image management mechanism unit 105.

Figure 4:
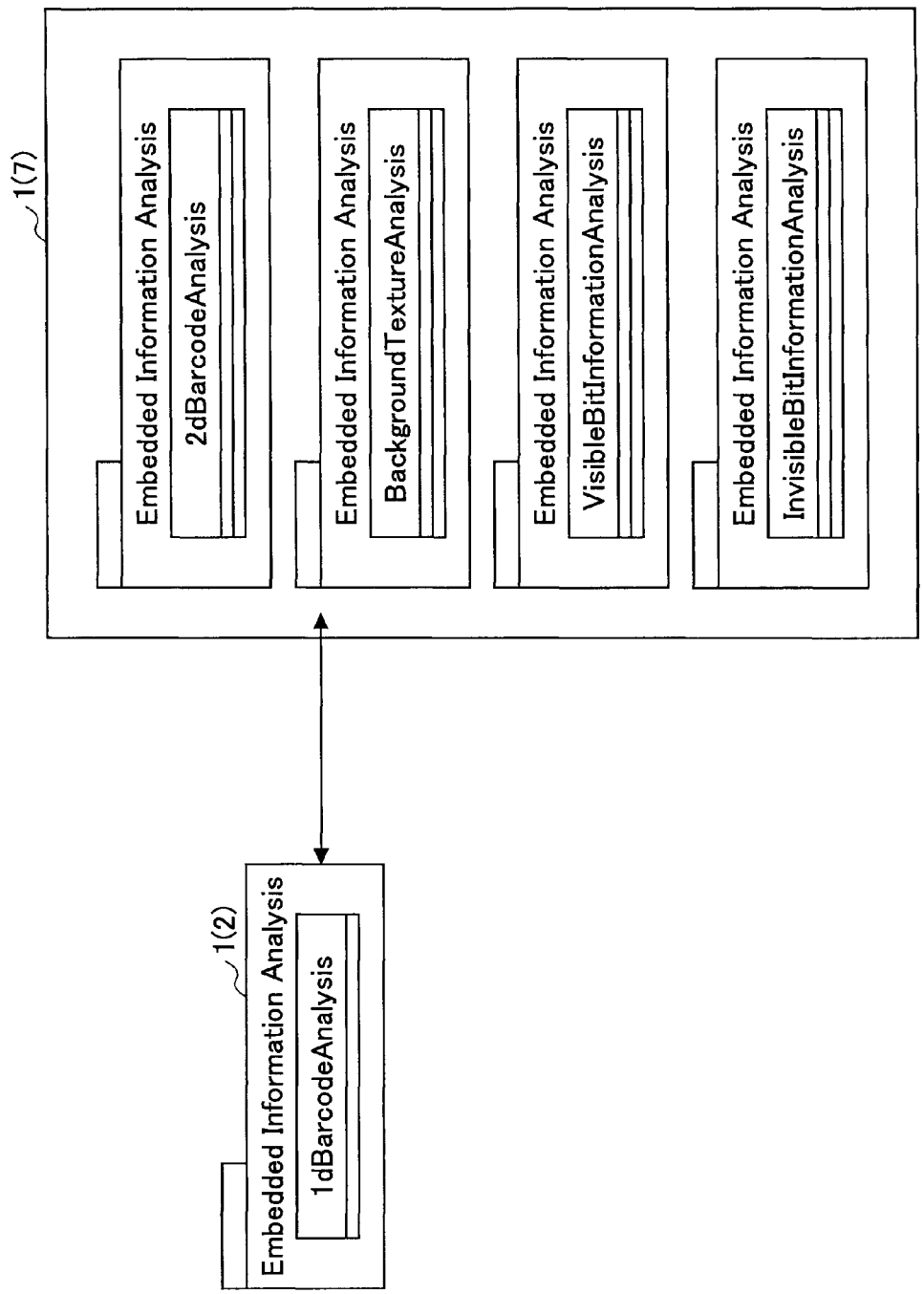
FIG. 4 is a block diagram showing an example of a change of an embedded information analysis mechanism unit.

FIG. 4 shows a block diagram of the embedded information analysis mechanism unit 102 being replaced.

While the embedded information analysis mechanism unit 102 is capable of analyzing a one-dimensional barcode, the new embedded information analysis mechanism unit 107 is capable of analyzing a two-dimensional barcode, a background texture or pattern, visible bit information, and non-visible bit information.

In a third example of the image processing apparatus of the present embodiment, the second interface (via which the embedded information analysis mechanism unit 102 and the behavior determination mechanism unit 103 are connected) and the third interface (via which the behavior determination mechanism unit 103 and the document output mechanism unit 104 are connected) are fixed. In this way, a new behavior determination mechanism unit 108 adapted to a program conforming to the fixed second and third interfaces can be developed and the existing behavior determination mechanism unit 103 can be replaced by it. Thus, the new behavior determination mechanism unit 108 can be obtained at low cost and without affecting any of the document input mechanism unit 101, the embedded information analysis mechanism unit 102, the document output mechanism unit 104, and the image management mechanism unit 105.

Figure 5:
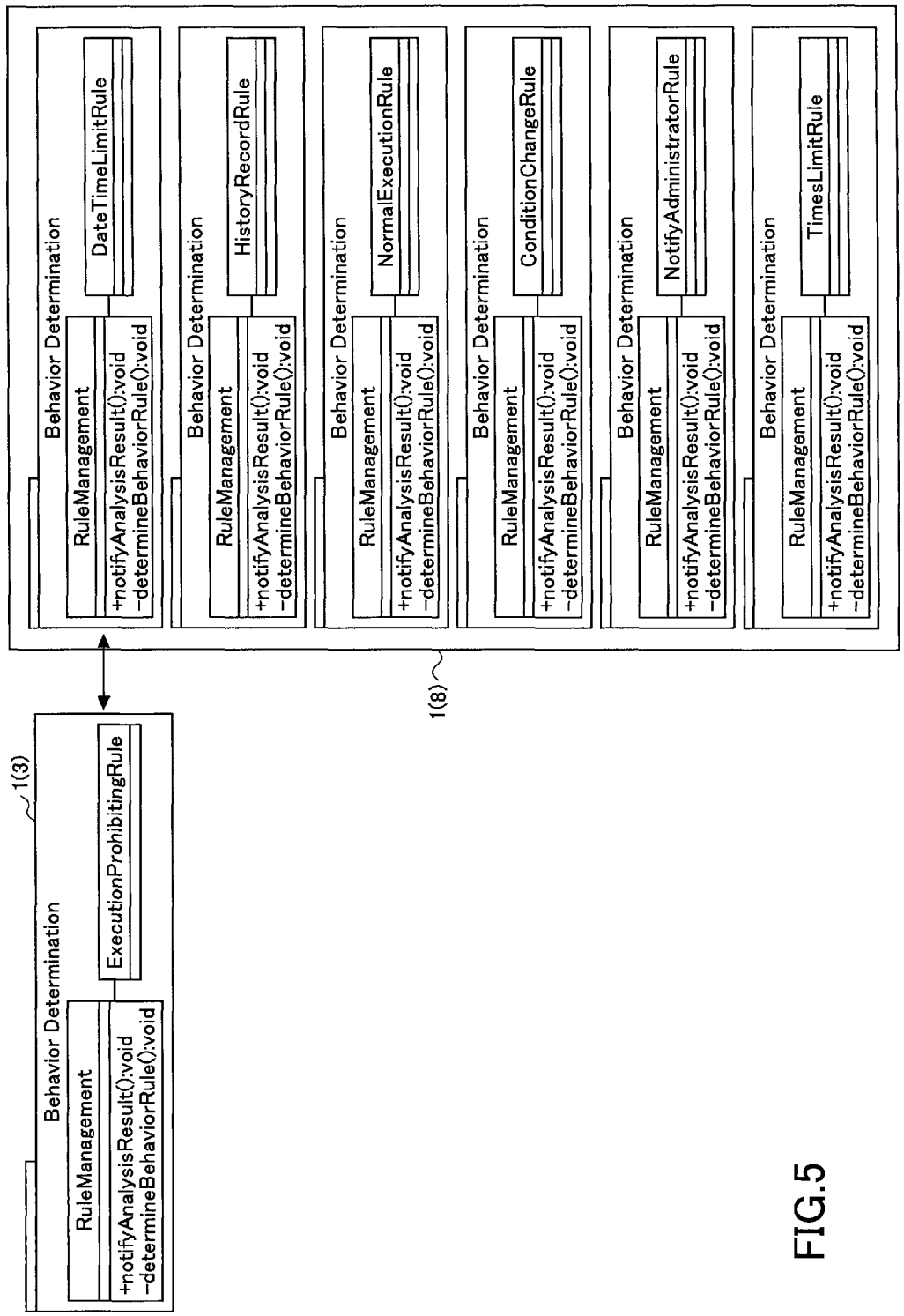
FIG. 5 is a block diagram showing an example of a change of a behavior determination mechanism unit.

FIG. 5 shows a block diagram of the behavior determination mechanism unit 103 being replaced.

As shown in FIG. 5, while the behavior determination mechanism unit 103 is capable of making settings for rule management and an execution prohibiting rule for behavior determination, the behavior determination mechanism unit 108 is capable of making settings for rule management and a date/time limiting rule; rule management and a history recording rule; rule management and a normal execution rule; rule management and a condition change rule; rule management and an administrator notification rule; and rule management and a number-of-times-limiting rule, for behavior determination.

In a fourth example of the image processing apparatus of the present embodiment, the third interface (via which the behavior determination mechanism unit 103 and the document output mechanism unit 104 are connected) and the fourth interface (via which the document output mechanism unit 104 and the image management mechanism unit 105 are connected) are fixed. In this way, a new document output mechanism unit 109 adapted to a program conforming to the fixed third and fourth interfaces can be developed and the existing document output mechanism unit 104 can be replaced by it. Thus, the new document output mechanism unit 109 can be obtained at low cost without affecting any of the document input mechanism unit 101, the embedded information analysis mechanism unit 102, the behavior determination mechanism unit 103, and the image management mechanism unit 105.

Figure 6:
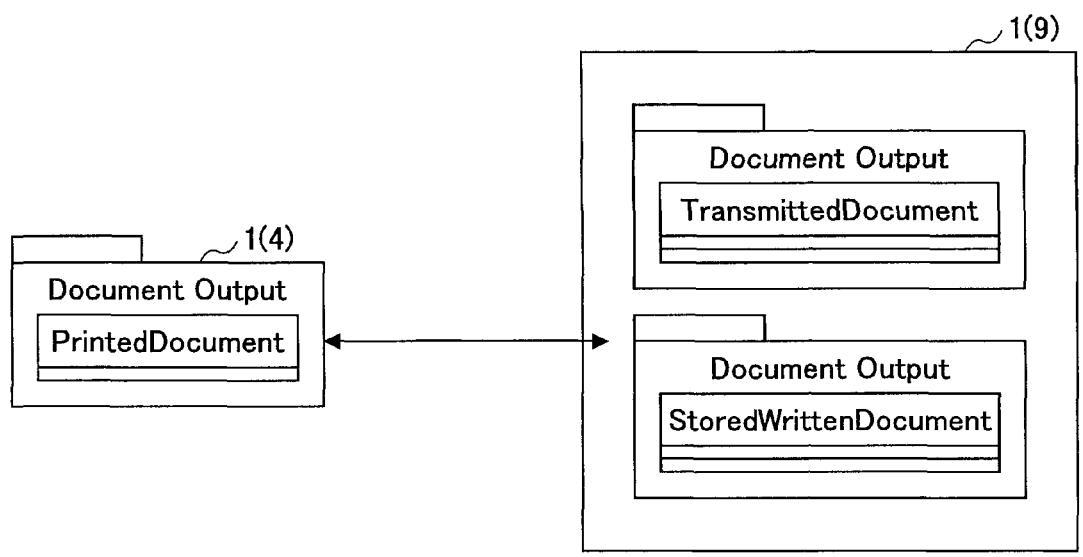
FIG. 6 is a block diagram showing an example of a change of a document output mechanism unit.

FIG. 6 shows a block diagram of the document output mechanism unit 104 being replaced.

As shown in FIG. 6, while the document output mechanism unit 104 is capable of processing a printed document as output document data, the new document input mechanism unit 109 is capable of processing a transmitted document and a stored/written document as output document data.

Figure 7:
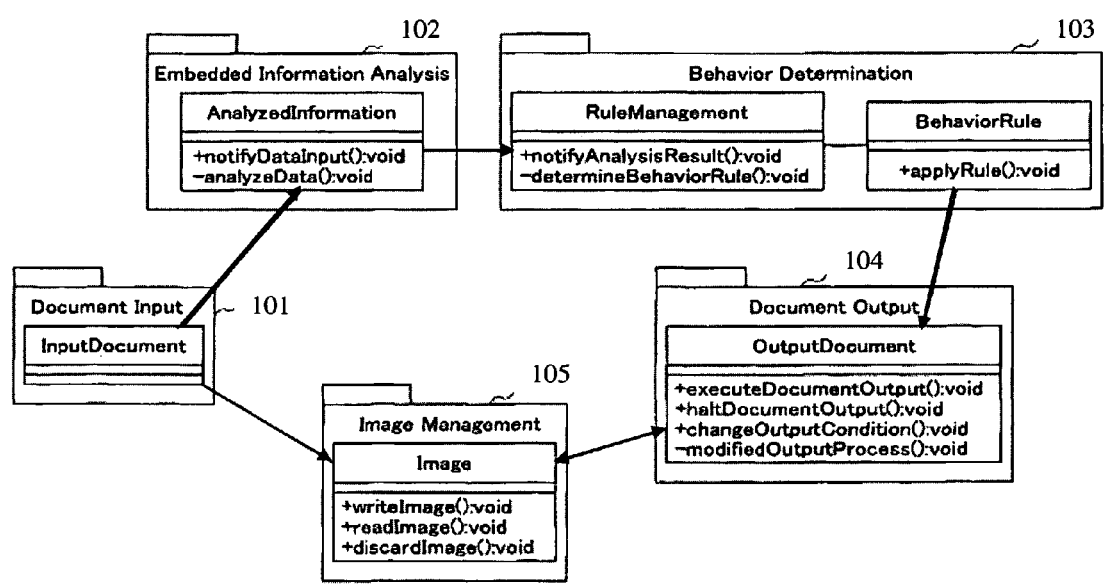
FIG. 7 is another block diagram showing an internal functional configuration of the CPU, corresponding to FIG. 2.

FIG. 7 shows another block diagram of an internal configuration of the CPU 1 on a functional mechanism basis, corresponding to the block diagram of FIG. 2. In FIG. 7, the first through fifth interfaces are omitted.

The block diagram of FIG. 7 differs from that of FIG. 2 only in the content of input document data in the document input mechanism unit 101. Specifically, in the block diagram of FIG. 7, the content of input document data, which is "Scanned Document" in FIG. 2, is modified to "Input Document," which represents a broader concept including "Scanned Document." In FIGS. 2 and 7, similar constituent elements are designated with similar reference numerals.

Figure 8:
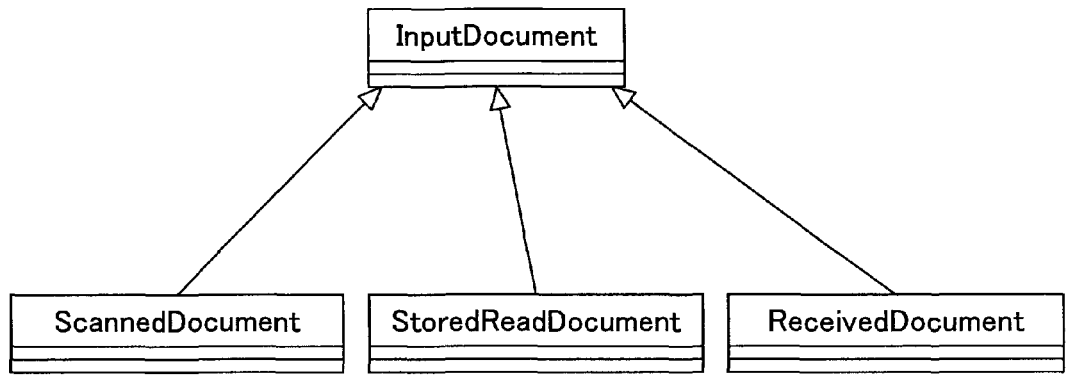
FIG. 8 is a drawing for the explanation of a fixed portion consisting of an extraction of common control portions for various input documents including a scanned document, a stored/read document, and a received document.
Figure 9:
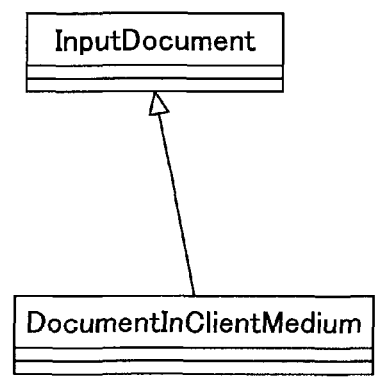
FIG. 9 is a drawing for explaining a fixed portion consisting of an extraction of common control portions for a media document specialized for a particular client.

With reference to FIGS. 8 and 9, a fixed portion consisting of an extraction of common control portions for input documents such as a scanned document, a stored/read document, a received document supplied from arbitrary input sources, and a media document specialized for a particular client, is described.

As shown in FIGS. 8 and 9, as long as the document input mechanism unit 101 retains the Input Document as the fixed portion consisting of an extraction of common control portions for various input document data, a program that inherits from the Input Document as the fixed portion can be developed and dynamically added. Thus, document input from an arbitrary input source or document input specialized for a particular client can be separately added at low cost without affecting the configuration of the image processing apparatus.

Figure 10:
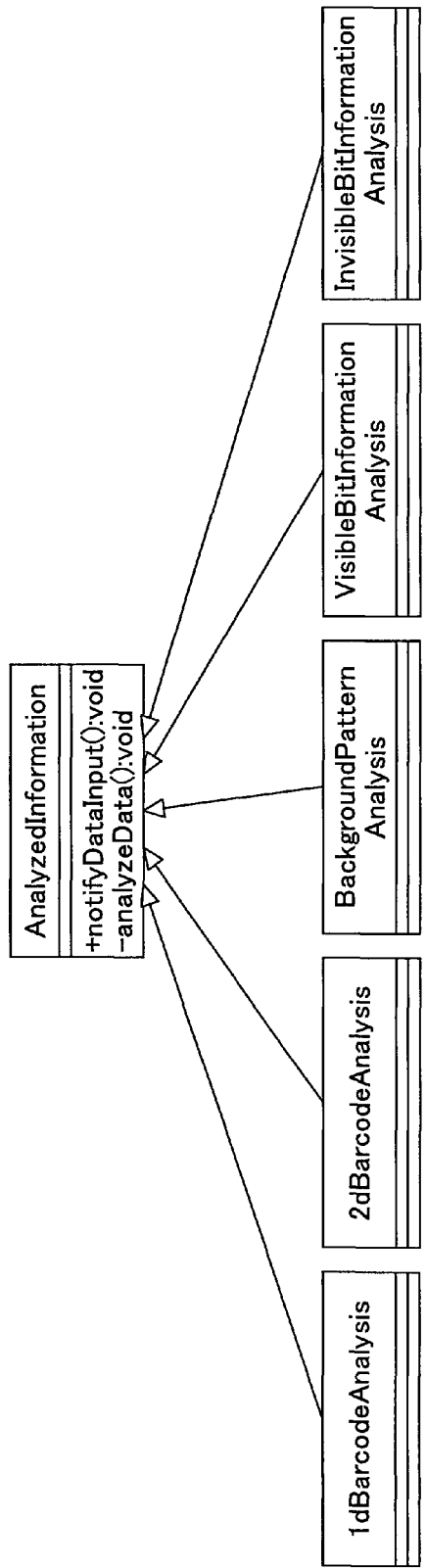
FIG. 10 is a drawing for the explanation of a fixed portion consisting of an extraction of common control portions for analyzing a one-dimensional barcode, a two-dimensional barcode, etc., embedded by arbitrary embedding techniques.
Figure 11:
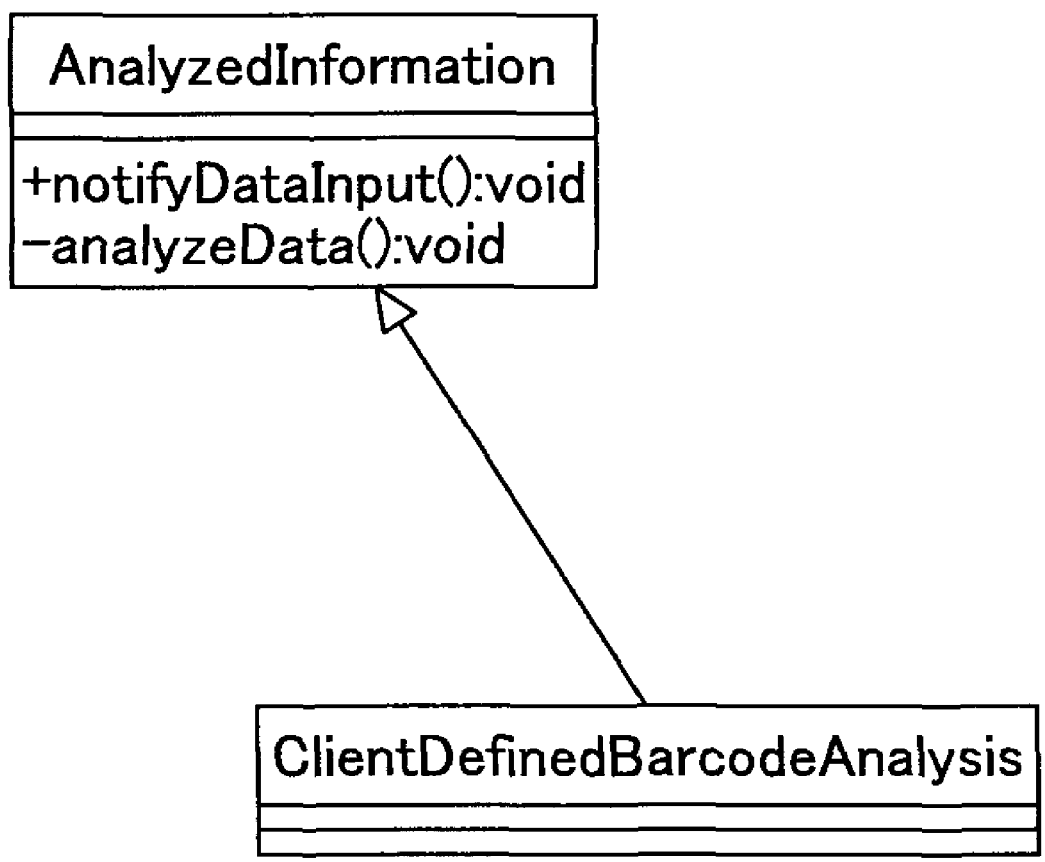
FIG. 11 is a drawing for the explanation of a fixed portion consisting of an extraction of common control portions for analyzing a barcode specialized for a particular client.

With reference to FIGS. 10 and 11, a fixed portion consisting of an extraction of common control portions for analyzing a one-dimensional barcode, a two-dimensional barcode, a background texture or pattern, visible bit information, non-visible bit information embedded by an arbitrary embedding technique, and a barcode specialized for a particular client, is described.

As shown in FIGS. 10 and 11, as long as the embedded information analysis mechanism unit 102 retains "Analysis Information" as the fixed portion consisting of an extraction of the common control portions for the analysis of various embedded information, a program that inherits from the Analysis Information as the fixed portion can be developed and dynamically added. Thus, analysis information based on an arbitrary embedding technique or barcode analysis information specialized for a particular client can be separately added at low cost without affecting the configuration of the image processing apparatus.

Figure 12:
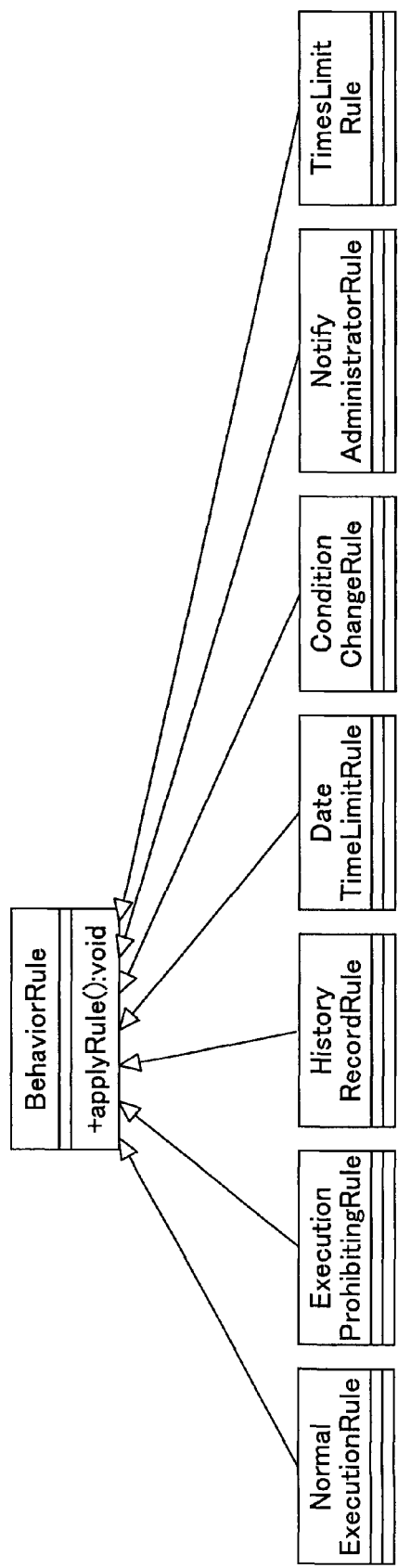
FIG. 12 is a drawing for the explanation of a fixed portion consisting of an extraction of common control portions for various behavior rules associated with various embedded information detection results.
Figure 13:
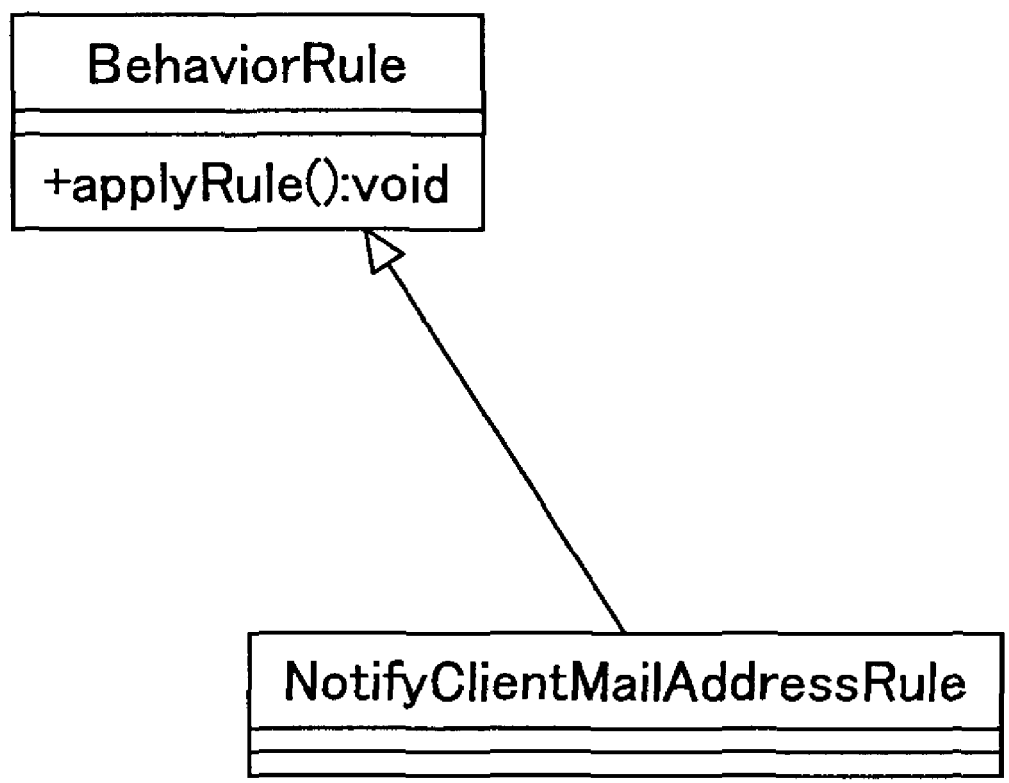
FIG. 13 shows a drawing for explaining a fixed portion consisting of an extraction of common control portions for a rule to send notification to a mail address of a particular client.

With reference to FIGS. 12 and 13, a fixed portion consisting of an extraction of common control portions for arbitrary behavior rules adapted to embedded information detection results is described. The rules include a normal execution rule; an execution prohibiting rule; a history recording rule; a date/time limiting rule; a condition change rule; an administrator notification rule; a number-of-times-limiting rule; and a rule to send notification to a particular client mail address.

As shown in FIGS. 12 and 13, as long as the behavior determination mechanism unit 103 retains "Behavior Rule" as the fixed portion consisting of an extraction of the common control portions for behaviors associated with embedded information detection results, a program that inherits from the Behavior Rule as the fixed portion can be developed and dynamically added. Thus, a behavior adapted to an arbitrary embedded information detection result or to a detection result concerning embedded information specialized for a particular client can be separately added at low cost and without affecting the configuration of the image processing apparatus.

Figure 14:
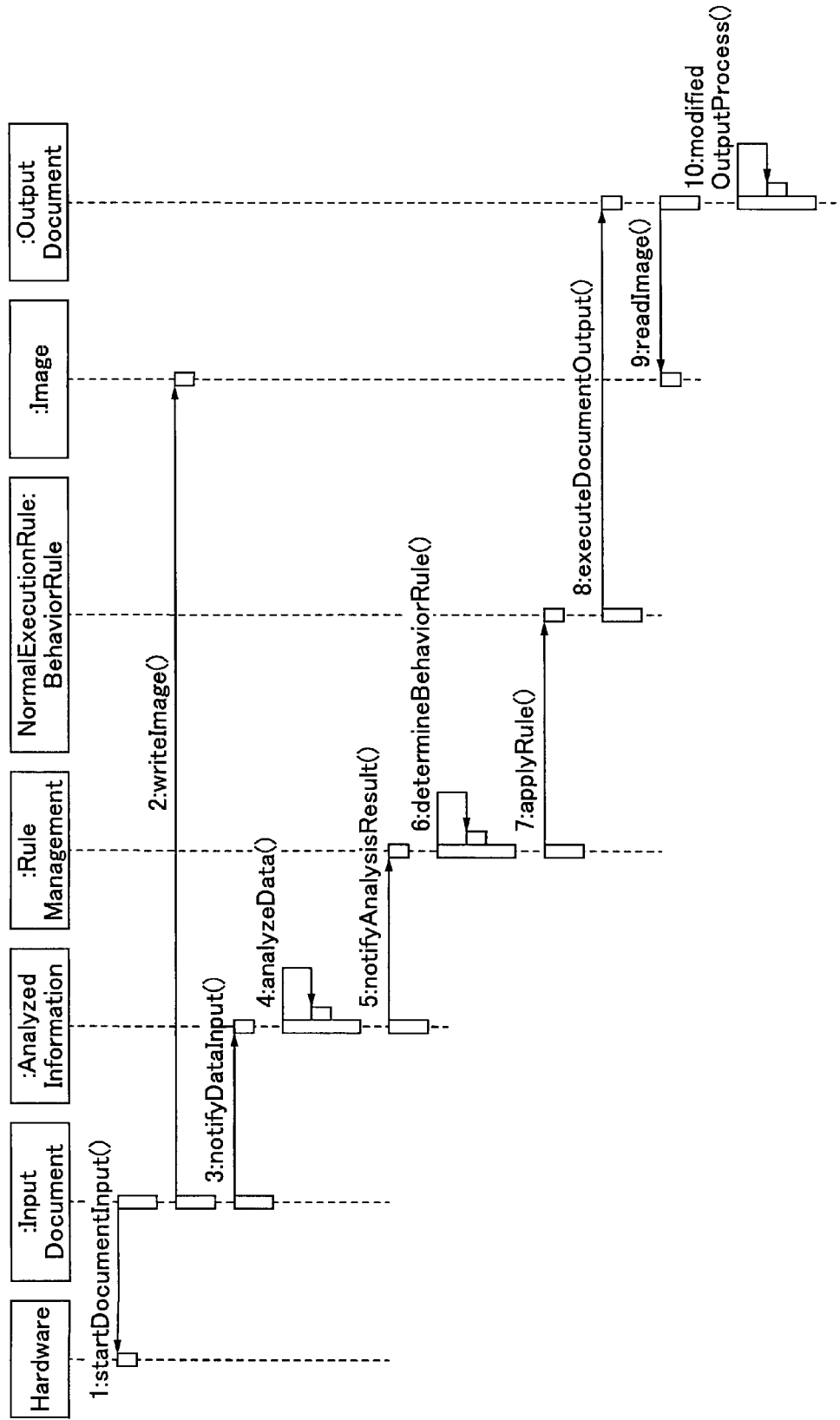
FIG. 14 shows a sequence of execution of a behavior in accordance with a normal execution rule.
Figure 15:
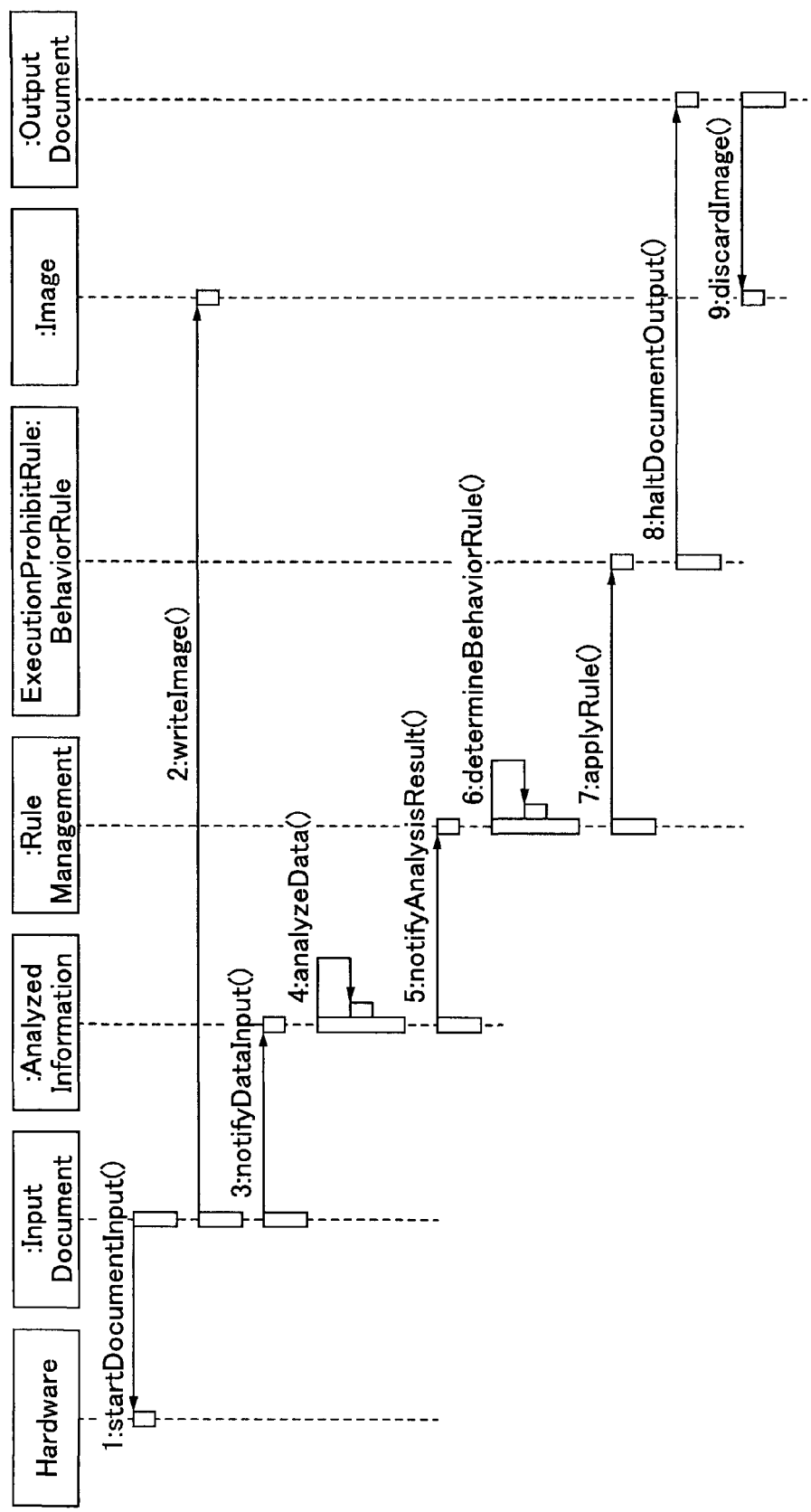
FIG. 15 shows a sequence of execution of a behavior in accordance with an execution prohibiting rule.
Figure 16:
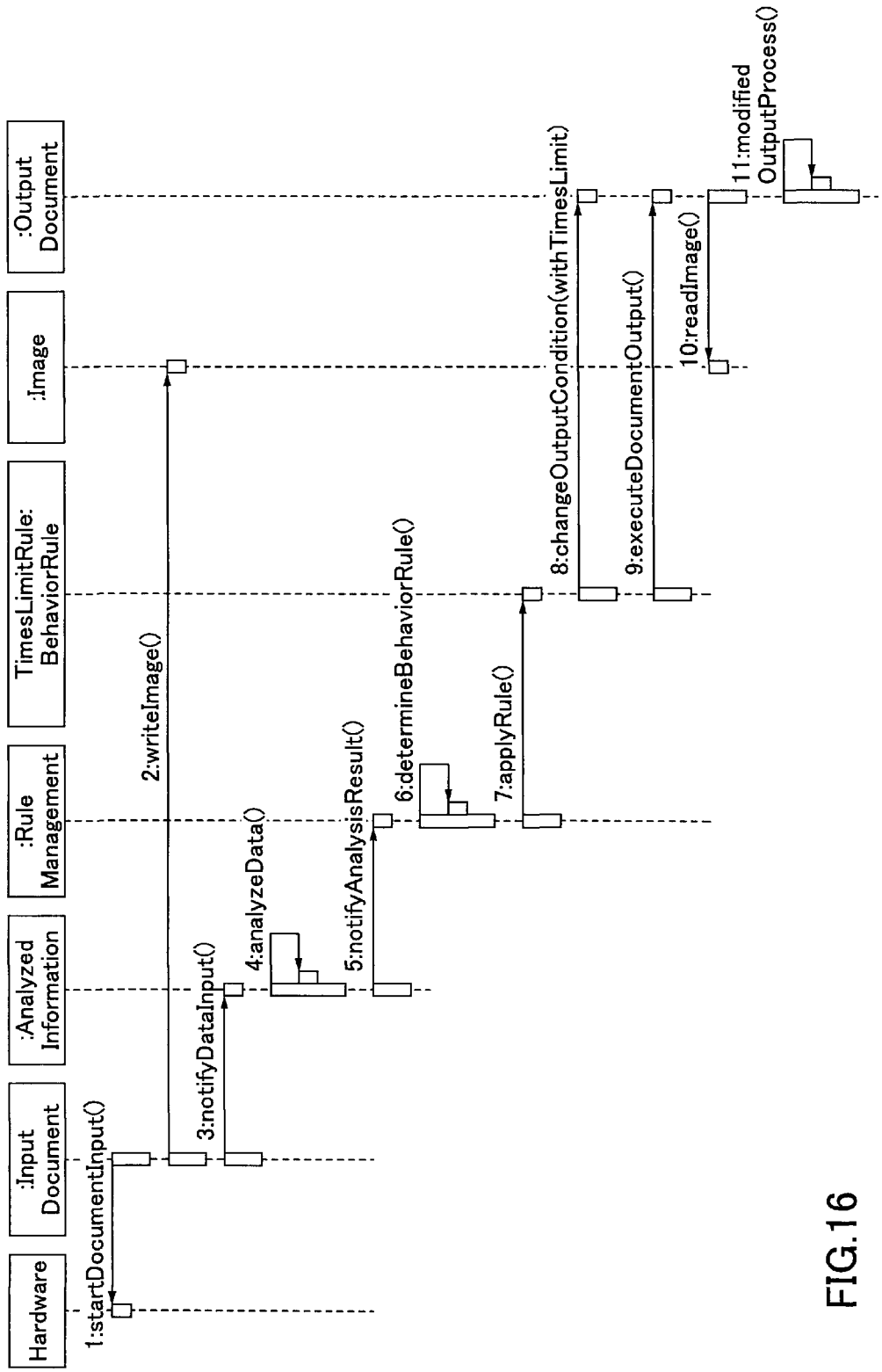
FIG. 16 shows a sequence of execution of a behavior in accordance with a number-of-times-limiting rule.

FIG. 14 shows a sequence of execution of a behavior in accordance with a normal execution rule. FIG. 15 shows a sequence of execution of a behavior in accordance with an execution prohibiting rule. FIG. 16 shows a sequence of execution of a behavior in accordance with a number-of-times-limiting rule.

As shown in FIG. 14, an operation in accordance with the normal execution rule is such that, as input document data is supplied from an external device (hardware) to the document input mechanism unit 101, the input document data is transmitted from the document input mechanism unit 101 to the embedded information analysis mechanism unit 102 and to the image management mechanism unit 105. The information analysis mechanism unit 102 analyzes the input document data and notifies the behavior determination mechanism unit 103 of an analysis result. The behavior determination mechanism unit 103 then selects a behavior rule based on the communicated analysis result, which in this case is the normal execution rule. The behavior determination mechanism unit 103 notifies the document output mechanism unit 104 of the application of the normal execution rule. In response, the document output mechanism unit 104 instructs the image management mechanism unit 105 to read out corresponding document data, and performs a modifying/output processing on the output document data.

Referring to FIG. 15, an operation according to the execution prohibiting rule is initially the same as the operation according to the normal execution rule. As input document data is supplied from an external device (hardware) to the document input mechanism unit 101, the input document data is transmitted to the embedded information analysis mechanism unit 102 and to the image management mechanism unit 105. The information analysis mechanism unit 102 analyzes the input document data and notifies the behavior determination mechanism unit 103 of an analysis result. The behavior determination mechanism unit 103 selects a corresponding behavior rule based on the analysis result, which in the present case is an execution prohibiting rule. The behavior determination mechanism unit 103 then notifies the document output mechanism unit 104 of the application of the execution prohibiting rule. In response, the document output mechanism unit 104 instructs the image management mechanism unit 105 to discard the corresponding document data, and ends the process.

Referring now to FIG. 16, an operation according to the number-of-times-limiting rule is initially the same as the operation according to the normal execution rule. As input document data is supplied from an external device (hardware) to the document input mechanism unit 101, the input document data is transmitted to the embedded information analysis mechanism unit 102 and to the image management mechanism unit 105. The information analysis mechanism unit 102 analyzes the input document data and notifies the behavior determination mechanism unit 103 of an analysis result. The behavior determination mechanism unit 103 then notifies the document output mechanism unit 104 of the application of a corresponding behavior rule based on the analysis result, which in this case is the number-of-times-limiting rule, and of a change in the output condition. In response, the document output mechanism unit 104 instructs the image management mechanism unit 105 to read out corresponding document data, and performs a modifying/output processing on the output document data.

Figure 17:
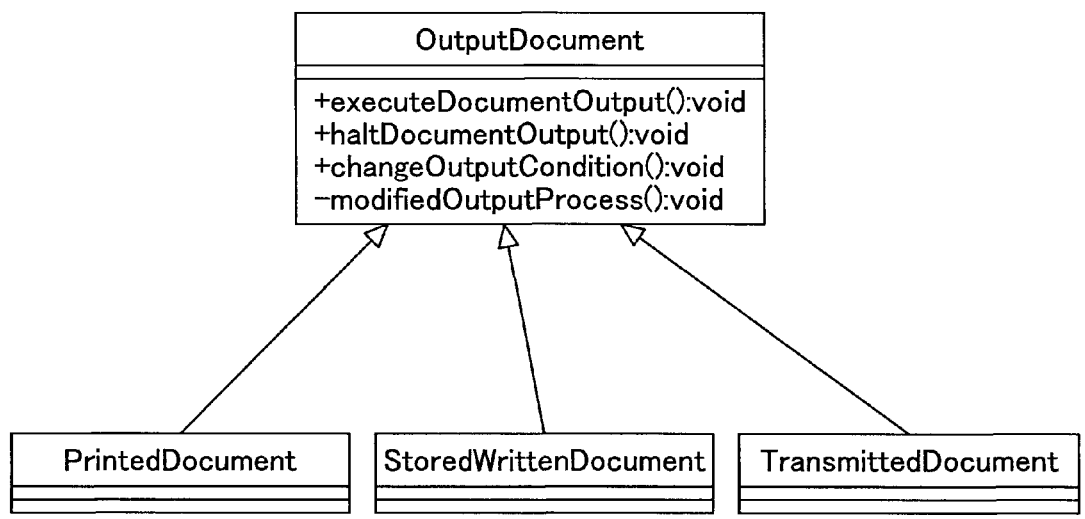
FIG. 17 is a drawing for the explanation of a fixed portion consisting of an extraction of common control portions for various output documents, including a printed document, a stored/written document, and a transmitted document.
Figure 18:
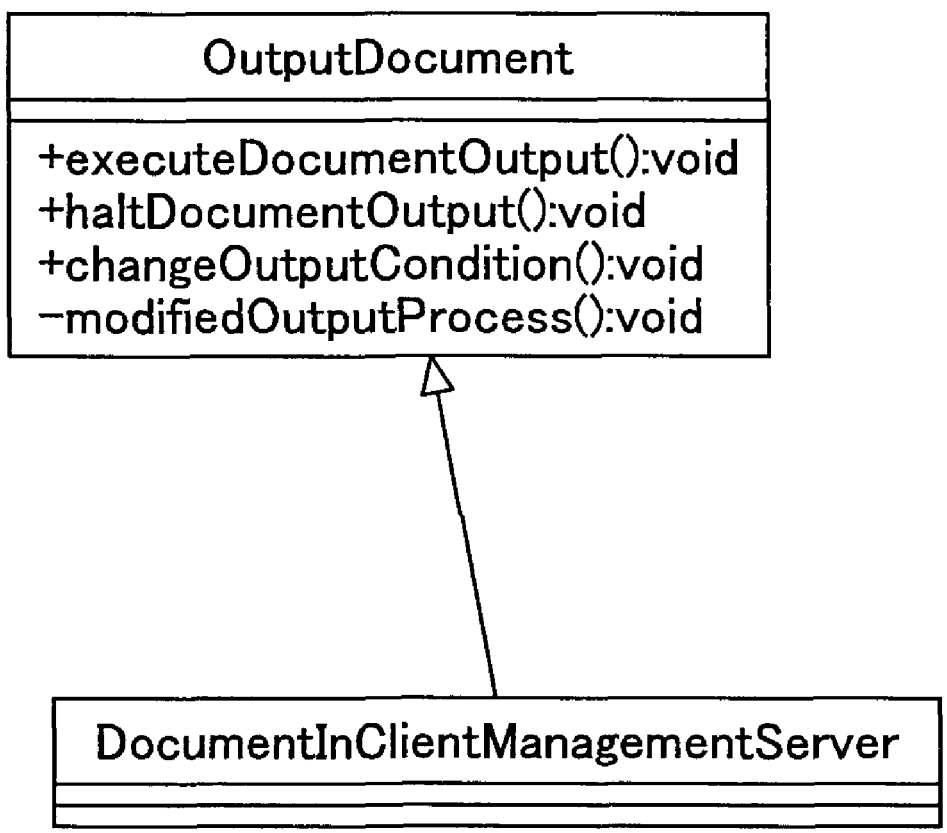
FIG. 18 is a drawing for describing a fixed portion consisting of an extraction of common control portions for a document in a management server specialized for a particular client.

With reference to FIGS. 17 and 18, a fixed portion consisting of an extraction of common control portions for output documents that are supplied to arbitrary output destinations is described. The documents include a printed document, a stored/written document, a transmitted document, and a document that is output to a management server specialized for a particular client.

As shown in FIGS. 17 and 18, as long as the document output mechanism unit 104 retains "Output Document" as the fixed portion consisting of an extraction of the common control portions for output document data, a program that inherits from the Output Document as the fixed portion can be developed and dynamically added. Thus, a document output supplied to an arbitrary output destination or a document output specialized for a particular client can be separately added at low cost without affecting the configuration of the image processing apparatus.

Figure 19:
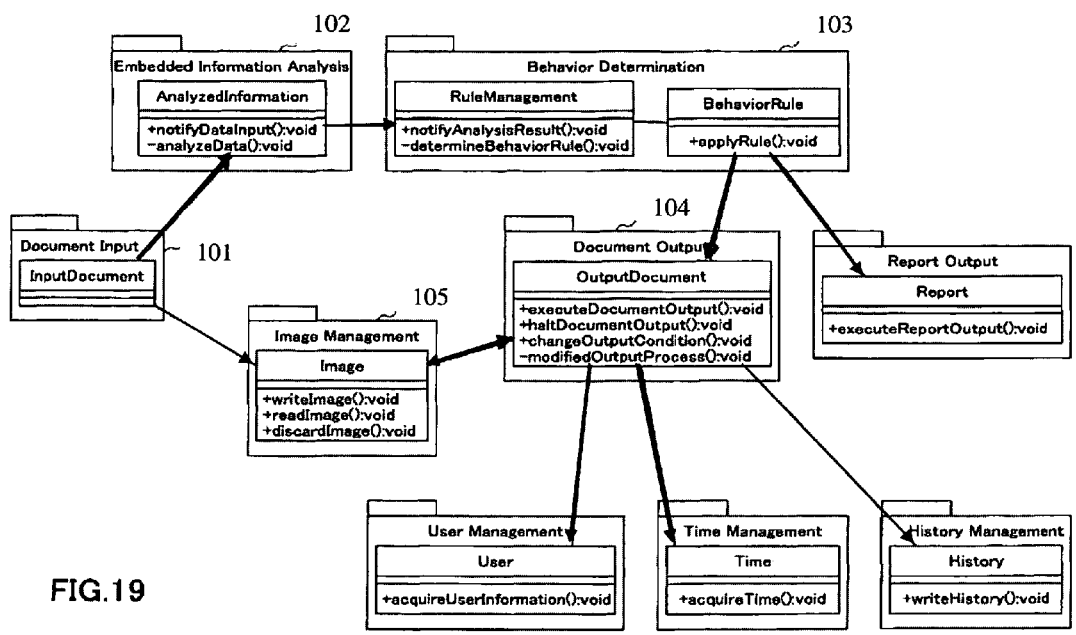
FIG. 19 shows a block diagram of an example in which a report output unit as well as a document output unit is added to a Behavior Rule in the behavior determination mechanism unit, and a user management unit, a time management unit, and a history management unit are added to an Output Document in the document output mechanism unit.
Figure 20:
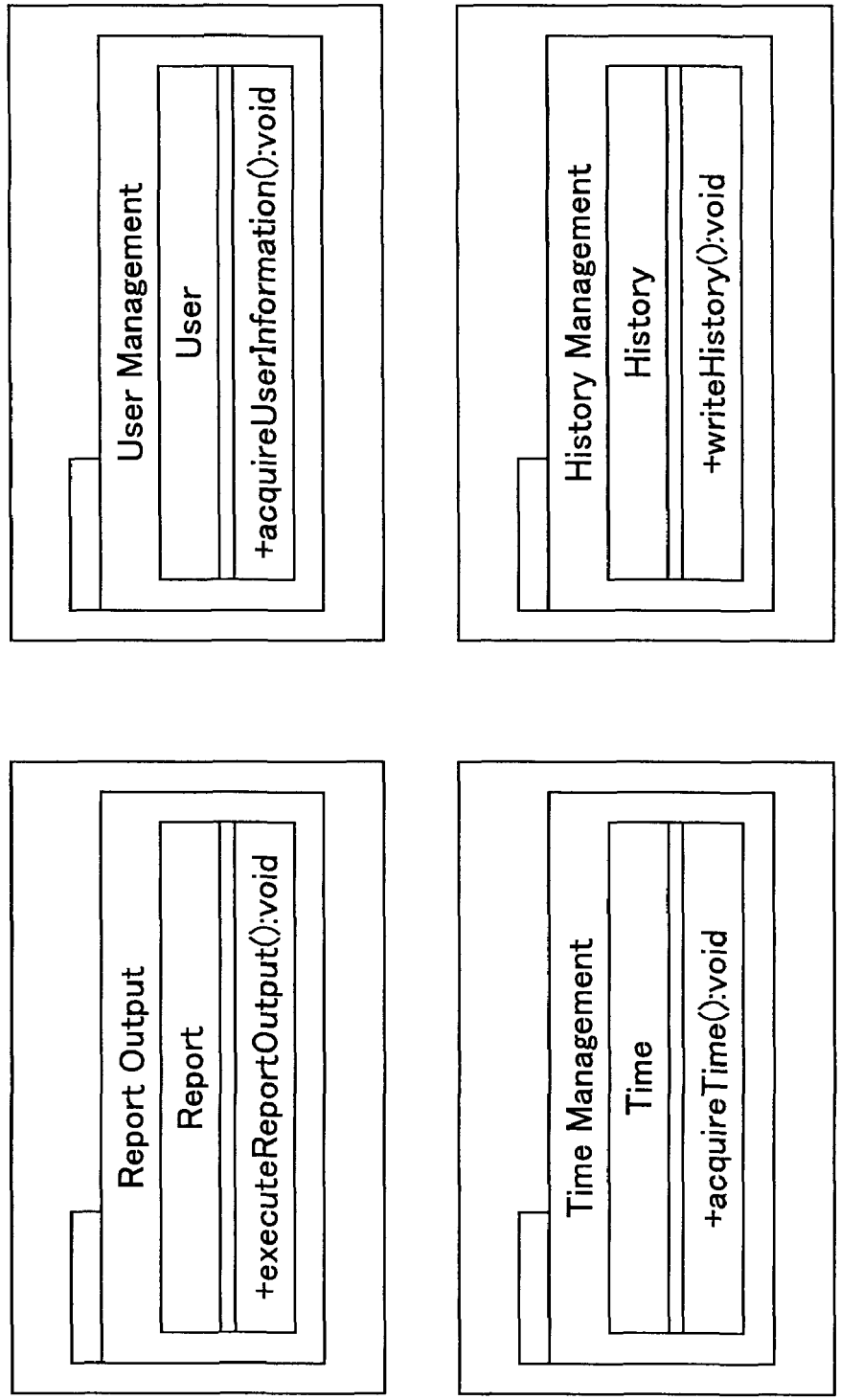
FIG. 20 shows a Report Output unit, a User Management unit, a Time Management unit, and a History Management unit.

FIGS. 19 and 20 show block diagrams of an example in which "Document Output" and "Report Output" are added to the Behavior Rule in the behavior determination mechanism unit 103, and "User Management," "Time Management," and "History Management" are added to the Output Document in the document output mechanism unit 104.

As shown in FIGS. 19 and 20, in the present example, it is possible to dynamically and separately add a general-purpose program for the Report Output upon application of a behavior rule in the behavior determination mechanism unit 103, or a general-purpose program for the User Management, Time Management, and History Management upon utilization of an output document in the document output mechanism unit 104. Thus, additions can be made to the system configuration of the image processing apparatus at low cost.

Figure 21:
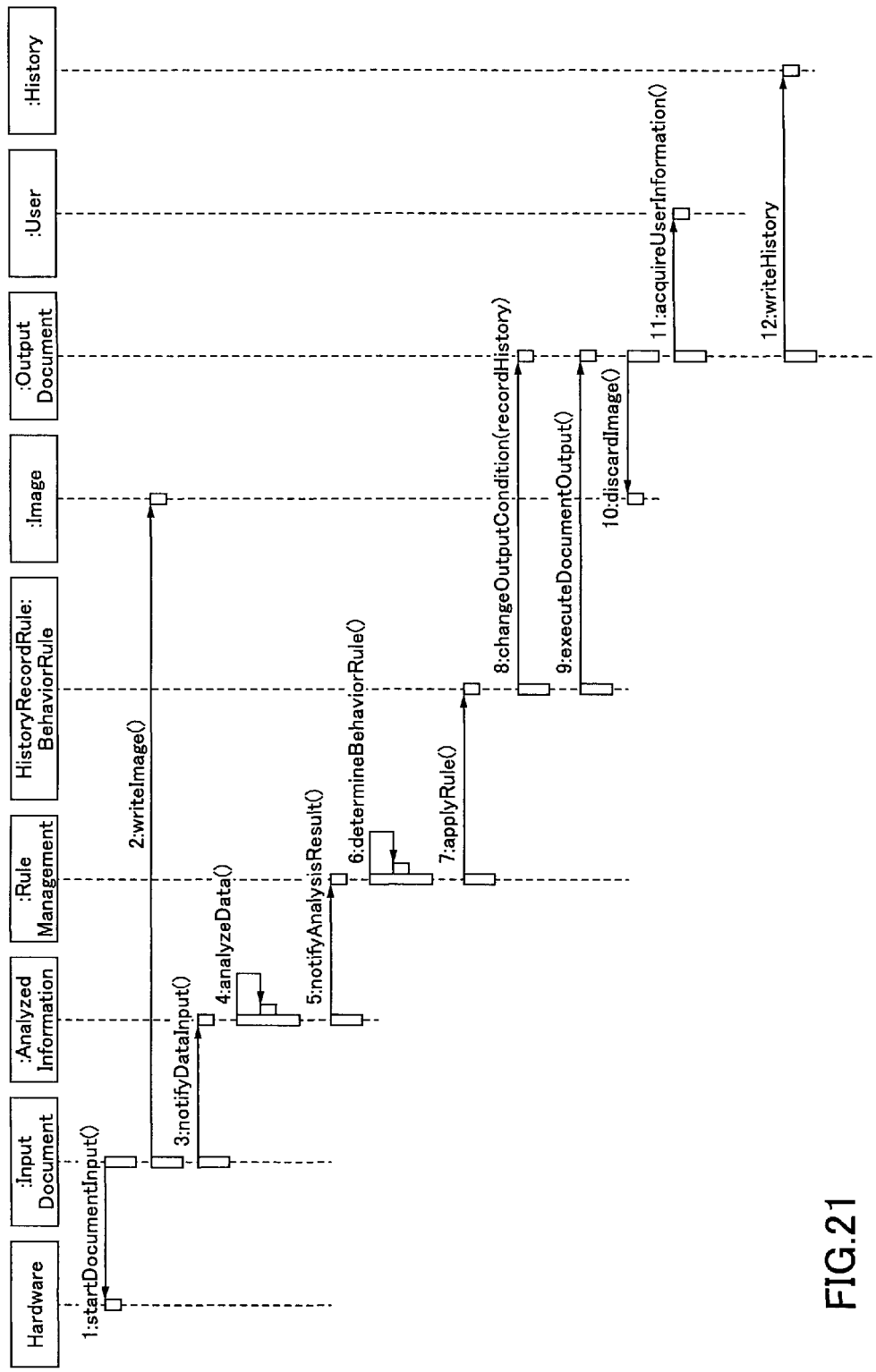
FIG. 21 shows a sequence of execution of a behavior in accordance with a history recording rule.
Figure 22:
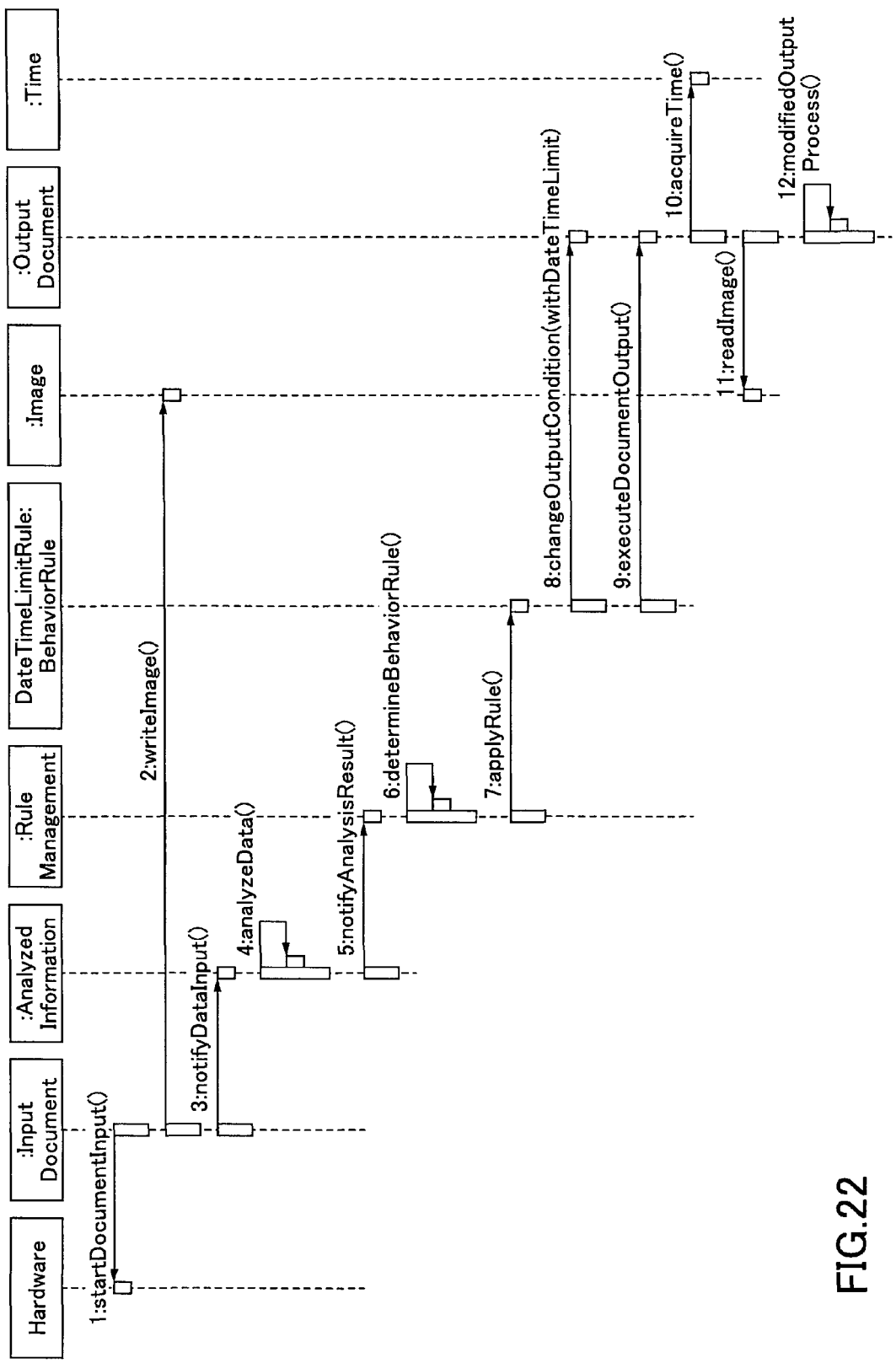
FIG. 22 shows a sequence of execution of a behavior in accordance with a date/time limiting rule.
Figure 23:
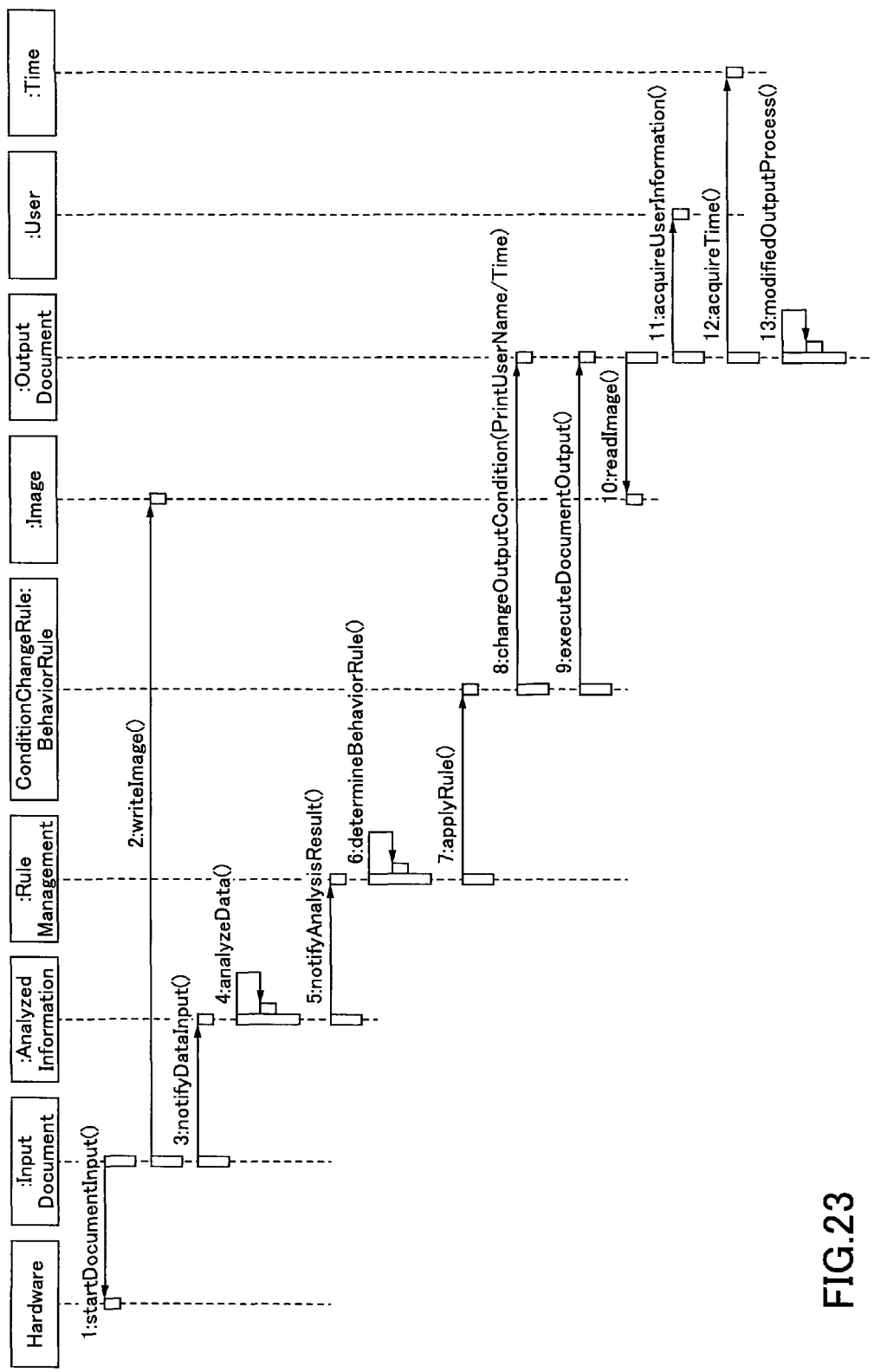
FIG. 23 shows a sequence of execution of a behavior in accordance with a condition change rule.
Figure 24:
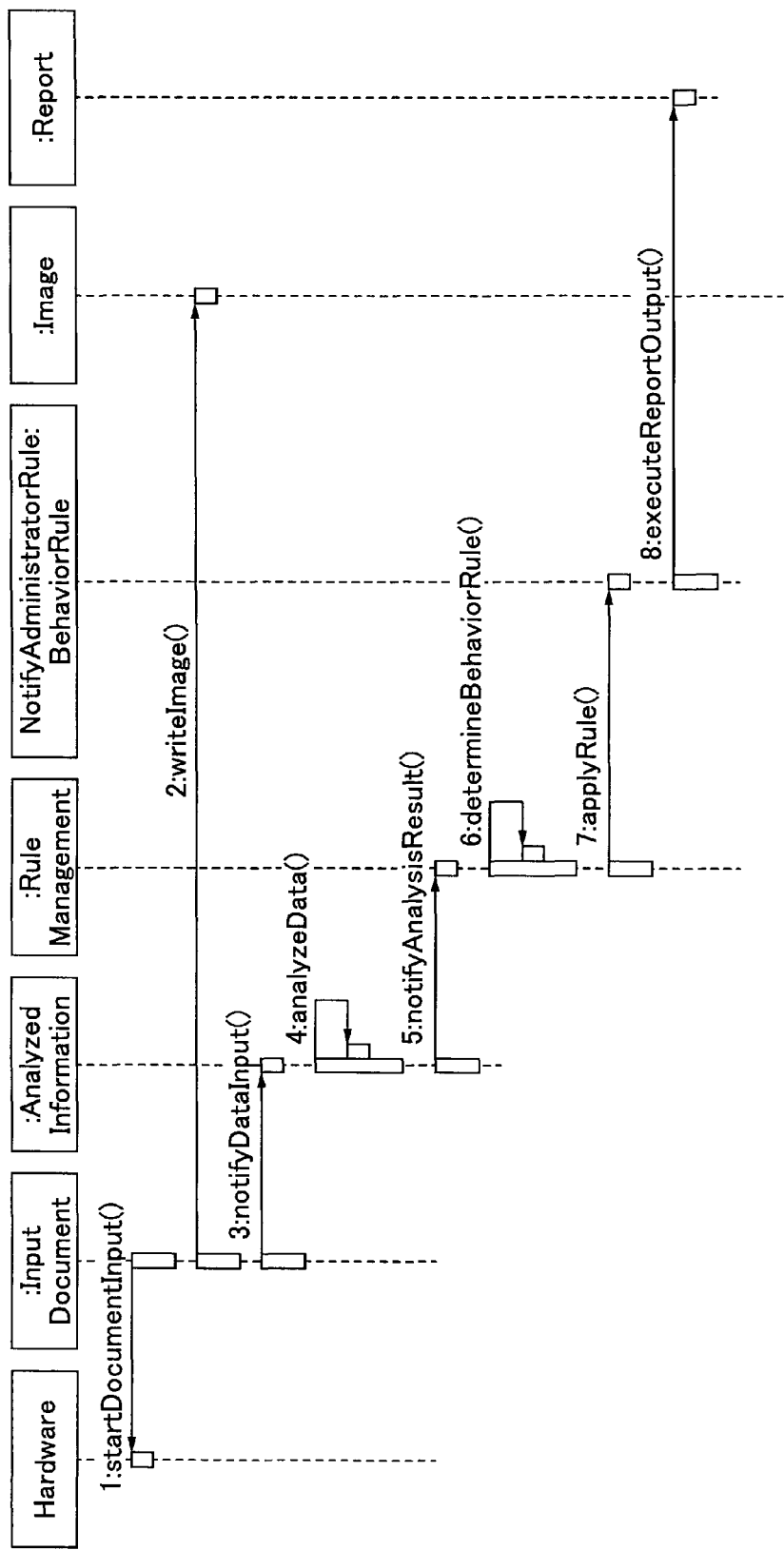
FIG. 24 shows a sequence of execution of a behavior in accordance with an administrator notification rule.

FIG. 21 shows a sequence of execution of a behavior in accordance with a history recording rule. FIG. 22 shows a sequence of execution of a behavior in accordance with a date/time limiting rule. FIG. 23 shows a sequence of execution of a behavior in accordance with a condition change rule. FIG. 24 shows a sequence of execution of a behavior in accordance with an administrator notification rule.

As shown in FIG. 21, an operation according to the history recording rule is such that, as input document data is supplied from an external device (hardware) to the document input mechanism unit 101, the input document data is transmitted to the embedded information analysis mechanism unit 102 and to the image management mechanism unit 105. The information analysis mechanism unit 102 analyzes the input document data, and notifies the behavior determination mechanism unit 103 of an analysis result. The behavior determination mechanism unit 103 then selects a corresponding behavior rule based on the analysis result, which in the present case is the history recording rule. The behavior determination mechanism unit 103 then notifies the document output mechanism unit 104 of the application of the history recording rule and a change in the output condition. In response, the document output mechanism unit 104 instructs the image management mechanism unit 105 to discard the corresponding document data. The document output mechanism unit 104 notifies the user that the input document data has been acquired, and record a history in the History Management.

Referring to FIG. 22, an operation according to the date/time limiting rule is initially the same as the operation according to the history recording rule. Input document data is supplied from an external device (hardware) to the document input mechanism unit 101. The input document data is then transmitted from the document input mechanism unit 101 to the embedded information analysis mechanism unit 102 and to the image management mechanism unit 105. The information analysis mechanism unit 102 analyzes the input document data, and notifies the behavior determination mechanism unit 103 of an analysis result. The behavior determination mechanism unit 103 selects a corresponding behavior rule based on the analysis result, which in the present case is the date/time limiting rule. The behavior determination mechanism unit 103 then notifies the document output mechanism unit 104 of the application of the date/time limiting rule and a change in the output condition. In response, the document output mechanism unit 104 instructs the image management mechanism unit 105 to read out corresponding document data, and performs a modifying/output processing on the output document data. Thereafter, the document output mechanism unit 104 acquires an output time for the output document, and outputs the document at the output time.

Referring to FIG. 23, an operation according to the condition change rule is initially the same as the operation according to the history recording rule. Specifically, as input document data is supplied from an external device (hardware) to the document input mechanism unit 101, the input document data is then transmitted to the embedded information analysis mechanism unit 102 and to the image management mechanism unit 105. The information analysis mechanism unit 102 analyzes the input document data and notifies the behavior determination mechanism unit 103 of an analysis result. The behavior determination mechanism unit 103 notifies the document output mechanism unit 104 of the application of a corresponding behavior rule based on the analysis result, which in the present case is the condition change rule, and of a change in the output condition. In response, the document output mechanism unit 104 instructs the image management mechanism unit 105 to read out corresponding document data, and performs a modifying/output processing on the output document data. Thereafter, the document output mechanism unit 104 notifies the user of the acquisition of the input document data, acquires an output time for the output document, and outputs the document at the output time.

With reference to FIG. 24, an operation according to the administrator notification rule is initially the same as the operation according to the history recording rule. Specifically, as input document data is supplied from an external device (hardware) to the document input mechanism unit 101, the input document data is then transmitted to the embedded information analysis mechanism unit 102 and to the image management mechanism unit 105. The information analysis mechanism unit 102 analyzes the input document data and notifies the behavior determination mechanism unit 103 of an analysis result. The behavior determination mechanism unit 103 sets the application of a corresponding behavior rule based on the analysis result, which in the present case is the administrator notification rule. The behavior determination mechanism unit 103 then transmits the content of a report to the Report Output in accordance with the behavior rule, whereby a report is output.

Figure 25:
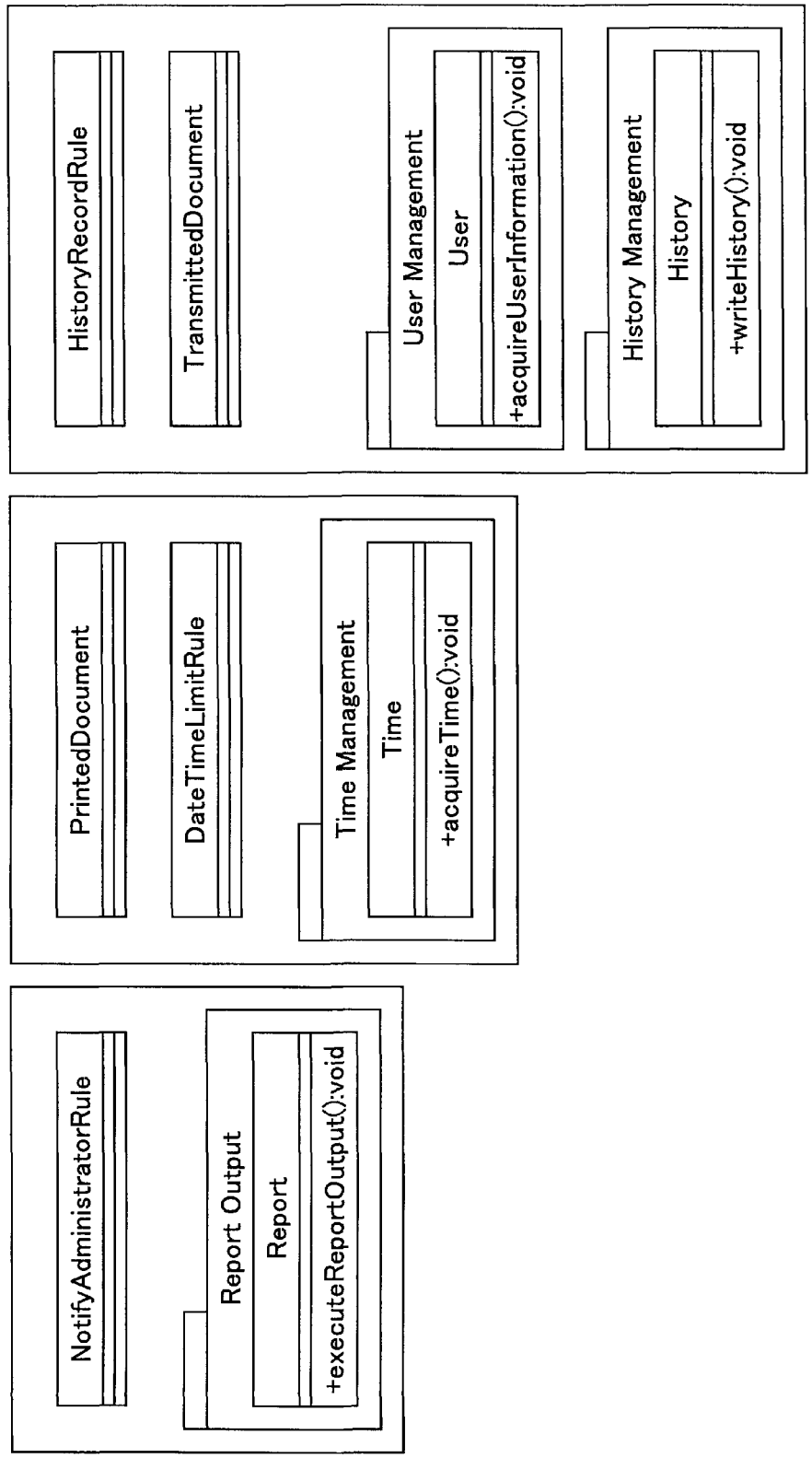
FIG. 25 shows an example in which various programs are added at once.

With reference to FIG. 25, an example of adding various programs all at once is described.

As shown in FIG. 25, this example involves a program for a behavior per se associated with an embedded information detection result and a program that is utilized during application of that behavior; and a program per se associated with document output to an arbitrary output destination and a program that is utilized when that document output is performed. Specifically, "Report Output" is added to "Administrator Notification Rule" in the Behavior Rule in the behavior determination mechanism unit 103; "Time Management" is added to "Date/Time Limiting Rule" in the same Behavior Rule and to the Printed Document in the document output mechanism unit 104; and "User Management" and "History Management" are added to the "History Recording Rule" in the same "Behavior Rule" and to the "Transmitted Document" in the document output mechanism unit 104.

Although the invention has been described with reference to particular examples, it will be appreciated by those skilled in the art that the invention may be embodied in many other forms.

The present application is based on the Japanese Priority Application No. 2007-070288 filed Mar. 19, 2007, the entire contents of which are hereby incorporated by reference.

What is claimed is:

1. An image processing apparatus in which embedded information in input document data is detected and an image processing is carried out in accordance with a result of detection of the embedded information, the image processing apparatus comprising:

a CPU; and a non-transitory storage medium tangibly embodying a program of instructions executable by the CPU to configure the CPU to include:

a document input mechanism configured to receive input document data including image data, the document input mechanism comprising a fixed portion consisting of an extraction of common control portions for plural input document types including scanned document, stored/read document, received document from an arbitrary input source and media document specialized for a particular client, wherein the document input mechanism inherits from the fixed portion, and is developed such that the document input mechanism inheriting from the fixed portion is dynamically added;

an embedded information analysis mechanism connected to the document input mechanism via a first interface, and configured to analyze embedded information in the received input document data, to determine an analysis result;

a behavior determination mechanism connected to the embedded information analysis mechanism via a second interface, and configured to determine a behavior rule based on the analysis result and output behavior rule information;

a document output mechanism connected to the behavior determination mechanism via a third interface, and configured to determine, based on the behavior rule information received from the behavior determination mechanism, a processing to be applied to the input document data; and an image management mechanism connected to the document output mechanism via a fourth interface and to the document input mechanism via a fifth interface to receive the input document data, and configured to manage the input document data in accordance with instruction received from the document output mechanism, wherein the document output mechanism determines the instruction to output to the image management mechanism based on the processing to be applied to the input document data;

wherein two of the first through fifth interfaces associated with any one of the mechanisms, including the document input mechanism, embedded information analysis mechanism, behavior determination mechanism, document output mechanism and image management mechanism, are fixed and are not changed even when said one of the mechanisms connected to the two interfaces is replaced by a substitute mechanism.

2. The image processing apparatus according to claim 1, wherein the first and fifth interfaces are fixed, and when the document input mechanism is replaced with another document input mechanism that conforms to the first and fifth interfaces during image processing, the other mechanisms, including the embedded information analysis mechanism, behavior determination mechanism, document output mechanism and image management mechanism, are not affected.

3. The image processing apparatus according to claim 1, wherein the first and second interfaces are fixed, and when the embedded information analysis mechanism is replaced with another embedded information analysis mechanism that conforms to the first and second interfaces during image processing, the other mechanisms, including the document input mechanism, behavior determination mechanism, document output mechanism and image management mechanism, are not affected.

4. The image processing apparatus according to claim 1, wherein the second and third interfaces are fixed, and when the behavior determination mechanism is replaced with another behavior determination mechanism that conforms to the second and third interfaces during image processing, the other mechanisms, including the document input mechanism, embedded information analysis mechanism, document output mechanism and image management mechanism, are not affected.

5. The image processing apparatus according to claim 1, wherein the third and fourth interfaces are fixed, and when the document output mechanism is replaced with another document output mechanism that conforms to the third and fourth interfaces, the other mechanisms, including the document input mechanism, embedded information analysis mechanism, behavior determination mechanism and image management mechanism, are not affected.

6. The image processing apparatus according to claim 3, wherein the embedded information analysis mechanism comprises a fixed portion consisting of an extraction of common control portions for various information embedding techniques, whereby a program that is developed such that the program inherits from the fixed portion is dynamically added.

7. The image processing apparatus according to claim 4, wherein the behavior determination mechanism comprises a fixed portion consisting of an extraction of common control portions for various behaviors associated with various embedded information detection results, and a program that is developed such that the program inherits from the fixed portion is dynamically added.

8. The image processing apparatus according to claim 5, wherein the document output mechanism comprises a fixed portion consisting of an extraction of common control portions for various document outputs to various output destinations, and a program that is developed such that the program inherits from the fixed portion is dynamically added.

9. The image processing apparatus according to claim 1, wherein a program that is utilized upon application of a behavior associated with an embedded information detection result, or a program that is utilized upon document output to an output destination is dynamically and individually added.

10. The image processing apparatus according to claim 1, wherein a program for a behavior associated with an embedded information detection result and a program that is utilized upon application of said behavior, or a program for a document output to an output destination and a program that is utilized upon such document output are individually and dynamically added at once.

* * * * *